(12) United States Patent
Inagaki et al.

(10) Patent No.: US 9,937,840 B2
(45) Date of Patent: Apr. 10, 2018

(54) CONSOLE BOX FOR REAR SEAT OF A VEHICLE

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Yuya Inagaki, Kariya (JP); Toshinao Wada, Toyota (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/331,956

(22) Filed: Oct. 24, 2016

(65) Prior Publication Data
US 2017/0136927 A1    May 18, 2017

(30) Foreign Application Priority Data
Nov. 18, 2015  (JP) .................................. 2015-225639

(51) Int. Cl.
*B60N 2/20*  (2006.01)
*B60N 3/00*  (2006.01)
*B60N 2/64*  (2006.01)
*B60N 3/10*  (2006.01)
*B60R 7/04*  (2006.01)

(52) U.S. Cl.
CPC ............... *B60N 3/002* (2013.01); *B60N 2/20* (2013.01); *B60N 2/64* (2013.01); *B60N 3/101* (2013.01); *B60R 7/043* (2013.01); *B60N 2205/35* (2013.01)

(58) Field of Classification Search
CPC . B60N 2/20; B60N 2/64; B60N 3/002; B60N 3/101; B60N 2205/35; B60R 7/043
USPC ......... 297/112, 113, 188.14, 188.15, 188.19, 297/238; 296/37.8, 24.34
See application file for complete search history.

(56) References Cited

U.S. PATENT DOCUMENTS 2,824,599 A * 2/1958 Quinlan ................... A47C 7/70
                                                     297/113 X
2,966,201 A * 12/1960 Strahler ............... B60N 2/3084
                                                     297/238

(Continued)

FOREIGN PATENT DOCUMENTS

JP    08-104178 A    4/1996
JP    08-198016 A    8/1996

(Continued)

*Primary Examiner* — Rodney B White
(74) *Attorney, Agent, or Firm* — Sughrue Mion, PLLC

(57) ABSTRACT

A vehicle includes a rear seat including a backrest portion and a console box adjoining the backrest portion on the vehicle front side. The console box includes a body portion disposed along the vehicle front-back direction, the body portion together with the backrest portion defining a gap; a projecting portion projecting from the body portion to immediately below the backrest portion; and a tray portion in the form of a receiver, the tray portion being disposed in the projecting portion and located below the gap. With these features, a vehicle is provided that allows easy collection of an article that has fallen into an area under a rear seat.

5 Claims, 3 Drawing Sheets

(56) References Cited

U.S. PATENT DOCUMENTS

| | | | | |
|---|---|---|---|---|
| 3,666,319 A * | 5/1972 | Moloney, Jr. | B60N 2/0232 | 297/113 |
| 3,951,448 A * | 4/1976 | Hawie | B60N 2/4613 | 297/113 |
| 4,685,729 A * | 8/1987 | Heesch | B60N 2/3056 | 297/113 X |
| 4,733,901 A * | 3/1988 | Okuyama | B60N 2/468 | 297/112 X |
| 5,116,099 A * | 5/1992 | Kwasnik | A47C 7/543 | 297/188.15 X |
| 5,150,946 A * | 9/1992 | Marfilius | B60N 2/4613 | 297/113 |
| 5,286,084 A * | 2/1994 | Bart | B60N 2/3084 | 297/238 X |
| 5,516,191 A * | 5/1996 | McKee | B60N 2/468 | 297/188.15 X |
| 5,620,228 A * | 4/1997 | Ito | A47C 7/68 | 297/113 X |
| 5,700,054 A * | 12/1997 | Lang | B60N 2/3084 | 297/112 |
| 5,704,685 A * | 1/1998 | Handa | B60N 2/3084 | 297/238 |
| 5,730,491 A * | 3/1998 | Carlsen | B60N 2/4686 | 297/188.14 |
| 5,743,593 A * | 4/1998 | Vogt | B60N 2/3084 | 297/238 |
| 5,788,324 A * | 8/1998 | Shea | B60N 2/462 | 297/113 |
| 5,788,326 A * | 8/1998 | Kawade | B60N 2/2812 | 297/238 X |
| 5,845,965 A * | 12/1998 | Heath | B60N 2/464 | 297/188.14 |
| 5,947,554 A * | 9/1999 | Mashkevich | B60N 2/4686 | 297/188.14 X |
| 6,033,015 A * | 3/2000 | Husted | B60N 2/4686 | 297/188.19 X |
| 6,045,173 A * | 4/2000 | Tiesler | B60N 2/4646 | 297/188.14 X |
| 6,152,514 A * | 11/2000 | McLellen | B60R 7/04 | 297/188.19 X |
| 6,217,112 B1 * | 4/2001 | Linsenmeier | B60N 2/4686 | 297/113 |
| 6,220,660 B1 * | 4/2001 | Bedro | B60N 2/468 | 297/113 X |
| 6,386,629 B1 * | 5/2002 | Severinski | B60N 2/3011 | 297/113 |
| 6,419,314 B1 * | 7/2002 | Scheerhorn | B60N 2/4646 | 297/188.14 X |
| 6,508,508 B1 * | 1/2003 | Bargiel | B60N 2/4613 | 297/188.19 X |
| 6,547,323 B1 * | 4/2003 | Aitken | B60N 2/4686 | 297/113 X |
| 6,572,188 B2 * | 6/2003 | Ozawa | B60N 2/4613 | 297/238 |
| 6,616,206 B2 * | 9/2003 | Luginbill | B60N 2/4646 | 297/188.19 X |
| 6,652,024 B2 * | 11/2003 | Prasatek | B60N 2/462 | 297/188.19 X |
| 6,719,367 B2 * | 4/2004 | Mic | B60N 2/4646 | 297/188.14 X |
| 7,178,865 B2 * | 2/2007 | Yetukuri | B60N 2/4613 | 297/112 |
| 7,458,634 B2 * | 12/2008 | Schlecht | B60N 2/4613 | 297/112 |
| 7,607,727 B2 * | 10/2009 | Park | B60N 2/4686 | 297/188.19 X |
| 7,631,931 B2 * | 12/2009 | Langensiepen | B60N 2/4613 | 297/188.15 X |
| 7,735,913 B2 * | 6/2010 | Crombez | B60N 2/4613 | 297/113 |
| 7,794,000 B2 * | 9/2010 | Ichimaru | B60N 3/102 | 297/188.15 X |
| 9,022,466 B2 * | 5/2015 | Cinco | B60N 2/4646 | 297/188.14 |
| 2002/0089217 A1 * | 7/2002 | Scheerhorn | B60N 2/4646 | 297/188.19 |
| 2003/0164628 A1 * | 9/2003 | Krausz | B60N 2/4606 | 297/188.19 X |
| 2004/0080173 A1 | 4/2004 | Niwa et al. | | |
| 2005/0146150 A1 | 7/2005 | Niwa et al. | | |
| 2009/0174236 A1 * | 7/2009 | Lota | B60N 2/4606 | 297/188.19 |
| 2013/0153447 A1 * | 6/2013 | Cinco | B60N 2/4686 | 206/216 |
| 2014/0132040 A1 * | 5/2014 | Arakawa | B60N 2/6009 | 297/112 |
| 2016/0129814 A1 * | 5/2016 | Goebbels | B60N 2/468 | 297/188.15 |

FOREIGN PATENT DOCUMENTS

| | | |
|---|---|---|
| JP | 2000-177495 A | 6/2000 |
| JP | 2004-249958 A | 9/2004 |
| JP | 2009280005 A | 12/2009 |

* cited by examiner

CONSOLE BOX FOR REAR SEAT OF A VEHICLE

This nonprovisional application is based on Japanese Patent Application No. 2015-225639 filed on Nov. 18, 2015 with the Japan Patent Office, the entire contents of which are hereby incorporated by reference.

BACKGROUND OF THE INVENTION

Field of the Invention

The present invention relates generally to a vehicle and relates more particularly to the structure of a rear seat of a vehicle.

Description of the Background Art

Regarding a conventional vehicle, for example, Japanese Patent Laying-Open No. 8-104178 discloses a console box of a car designed to have a substantially enlarged storage capacity without involving reduction in comfortableness. The console box disclosed in Japanese Patent Laying-Open No. 8104178 is provided with a receiving portion at the lower end portion of an outer wall of the console box. The receiving portion protrudes toward the assistant driver's seat below the lower surface of the seat cushion of the assistant driver's seat.

Further, Japanese Patent Laying-Open No. 8-198016 discloses a vehicle interior trim device designed to allow easy removal of a fallen article without the need to deeply insert a hand between a seat and a console box. In the vehicle interior trim device disclosed in Japanese Patent Laying-Open No. 8-198016, a container for receiving a fallen article is removably provided between the front seat cushion and the console box.

Further, Japanese Patent Laying-Open No. 2004-249958 discloses a console box designed to allow an armrest to be stably moved over the box body without a wobble, designed to provide a sense of luxuriousness, and designed to improve usability. The console box disclosed in Japanese Patent Laying-Open No. 2004-249958 is provided with a pair of side walls at both sides of the box body extending in parallel with the vehicle front-back direction. The armrest, which also serves as a lid to open and close the container in the box body, is supported on the side walls movably in the vehicle front-back direction.

SUMMARY OF THE INVENTION

As disclosed in Japanese Patent Laying-Open Nos. 8-104178, 8-198016 and 2004-249958 above, a vehicle provided with a console box in the vehicle compartment is known. A case where such a console box is installed on a seat surface of a rear seat being assumed, there is a risk of an article falling into an area under the rear seat from a gap between the console box and the backrest portion of the rear seat. There is thus a need for a vehicle structure that allows easy collection of an article that has fallen into an area under a rear seat.

Accordingly, an object of the present invention is to solve the above problem and to provide a vehicle that allows easy collection of an article that has fallen into an area under a rear seat.

A vehicle according to the present invention includes a rear seat including a backrest portion and a forward member adjoining the backrest portion on the vehicle front side. The forward member includes a body portion disposed along the vehicle front-back direction, the body portion together with the backrest portion defining a gap; a projecting portion projecting from the body portion to immediately below the backrest portion; and a tray portion in the form of a receiver, the tray portion being disposed in the projecting portion and located below the gap.

The present invention can provide a vehicle that allows easy collection of an article that has fallen into an area under a rear seat.

The foregoing and other objects, features, aspects and advantages of the present invention will become apparent from the following detailed description of the present invention when taken in conjunction with the accompanying drawings.

DESCRIPTION OF THE PREFERRED EMBODIMENTS

Hereinafter reference will be made to the drawings to describe an embodiment of the present invention. Note that in the figures referred to hereinafter, identical or equivalent members are identically denoted.

Figure 1:
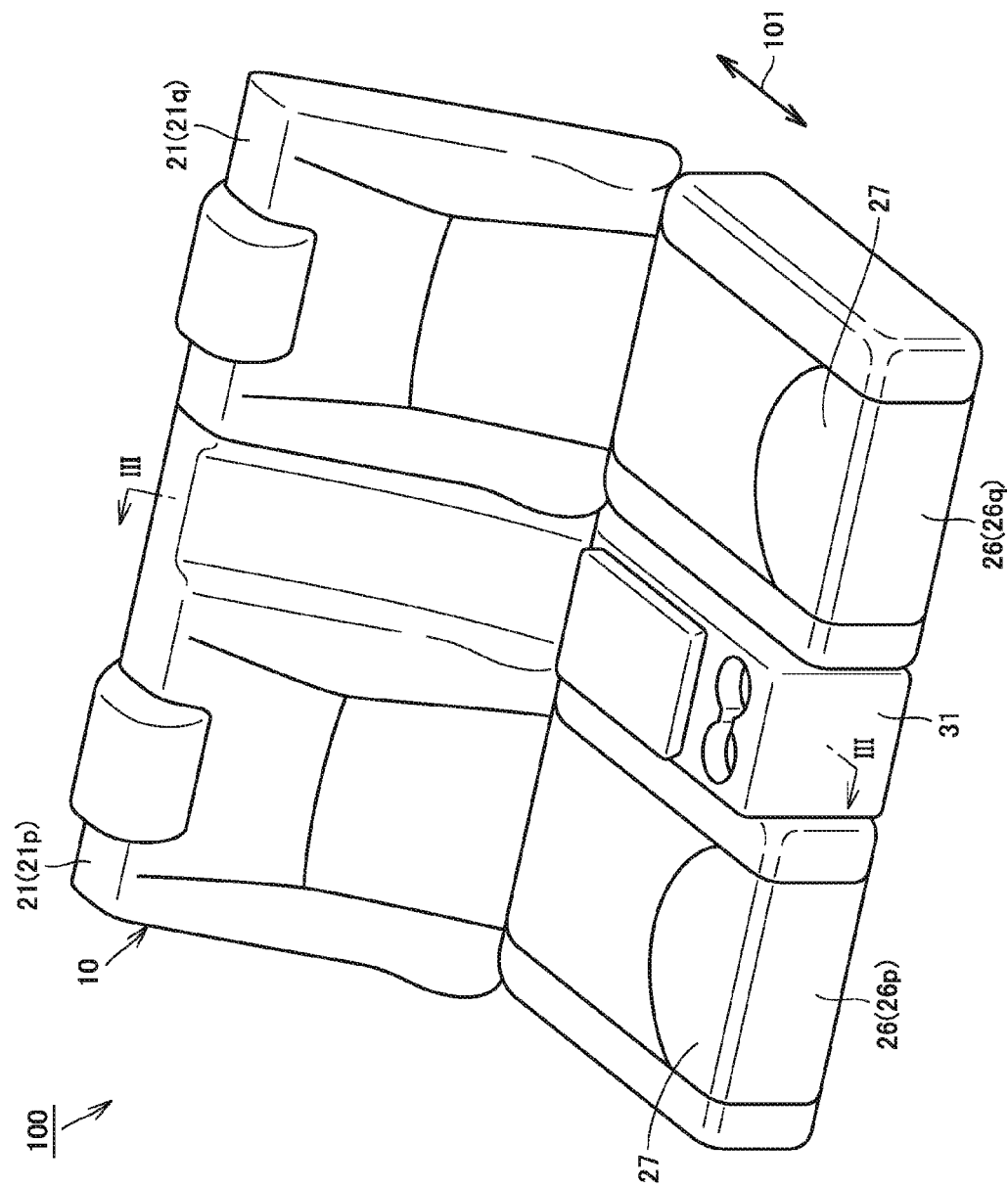
FIG. 1 is a perspective view of a rear seat installed in the interior of a vehicle in an embodiment of the present invention.

FIG. 1 is a perspective view of a rear seat installed in the interior of a vehicle in an embodiment of the present invention. With reference to FIG. 1, a vehicle 100 in the present embodiment is a hybrid car having as a source of power an internal combustion engine such as a gasoline engine and a diesel engine, and a motor driven by electric power supplied from a battery.

The vehicle in the present invention is not limited to a hybrid car but may be, for example, a car having only an internal combustion engine as a source of power, an electric car, or a fuel cell powered car.

The vehicle 100 includes a rear seat 10. The rear seat 10 is a seat installed on the vehicle rear side relative to a first-row seat which includes the driver's seat. The rear seat 10 is typically a second-row seat but is not limited thereto. The rear seat 10 may also be a third-row seat of a vehicle that is provided with seats in the first to third rows, for example.

The rear seat 10 includes a backrest portion 21, a seat portion 26, and a console box 31.

The backrest portion 21 is a region of the seat against which an occupant seated on the rear seat 10 leans his or her back. The backrest portion 21 has a reclining function whereby the backrest portion 21 can tilt in the vehicle front-back direction. The backrest portion 21 is composed of a backrest portion 21*p* installed on the right side in the vehicle compartment and of a backrest portion 21*q* installed on the left side in the vehicle compartment. The backrest portion 21*p* and the backrest portion 21*q* can be actuated independently of each other at the time of reclining.

The seat portion 26 is a region of the seat on which an occupant on the rear seat 10 sits. The seat portion 26 adjoins the backrest portion 21 on the vehicle front side. The seat portion 26 is composed of a seat portion 26*p* installed on the right side in the vehicle compartment and of a seat portion 26*q* installed on the left side in the vehicle compartment. The seat portion 26p adjoins the backrest portion 21p on the vehicle front side, and the seat portion 26q adjoins the backrest portion 21q on the vehicle front side. The seat portion 26p and the seat portion 26q are disposed with an interval lying therebetween in the vehicle width direction.

The console box 31 is a seat fixture that forms an article storage case. The console box 31 is disposed between the seat portion 26p and the seat portion 26q. The console box 31 adjoins the backrest portion 21 (21p) on the vehicle front side. The console box 31 protrudes above a seat surface 27 of the seat portion 26.

Figure 2:
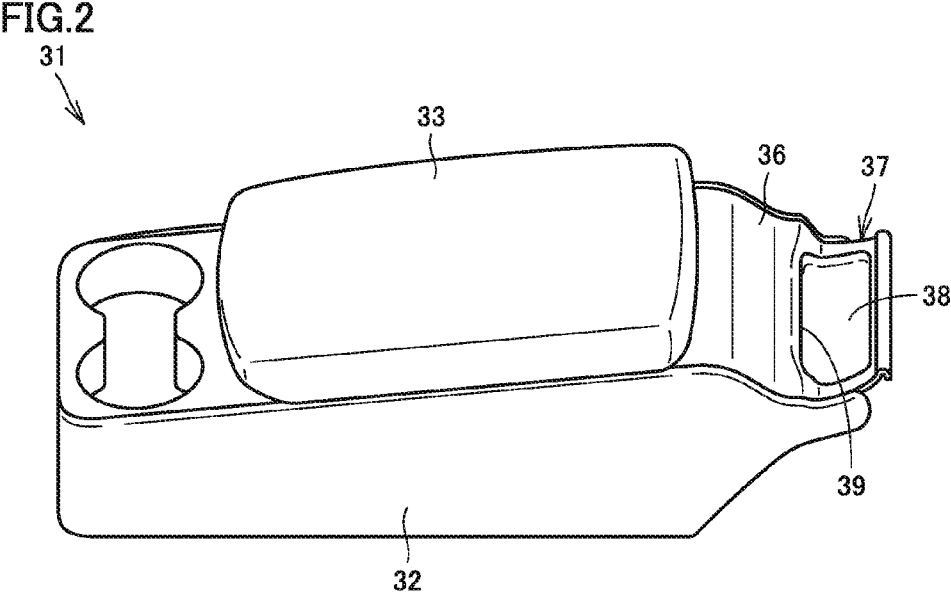
FIG. 2 is a perspective view showing the appearance of the console box shown in FIG. 1.
Figure 3:
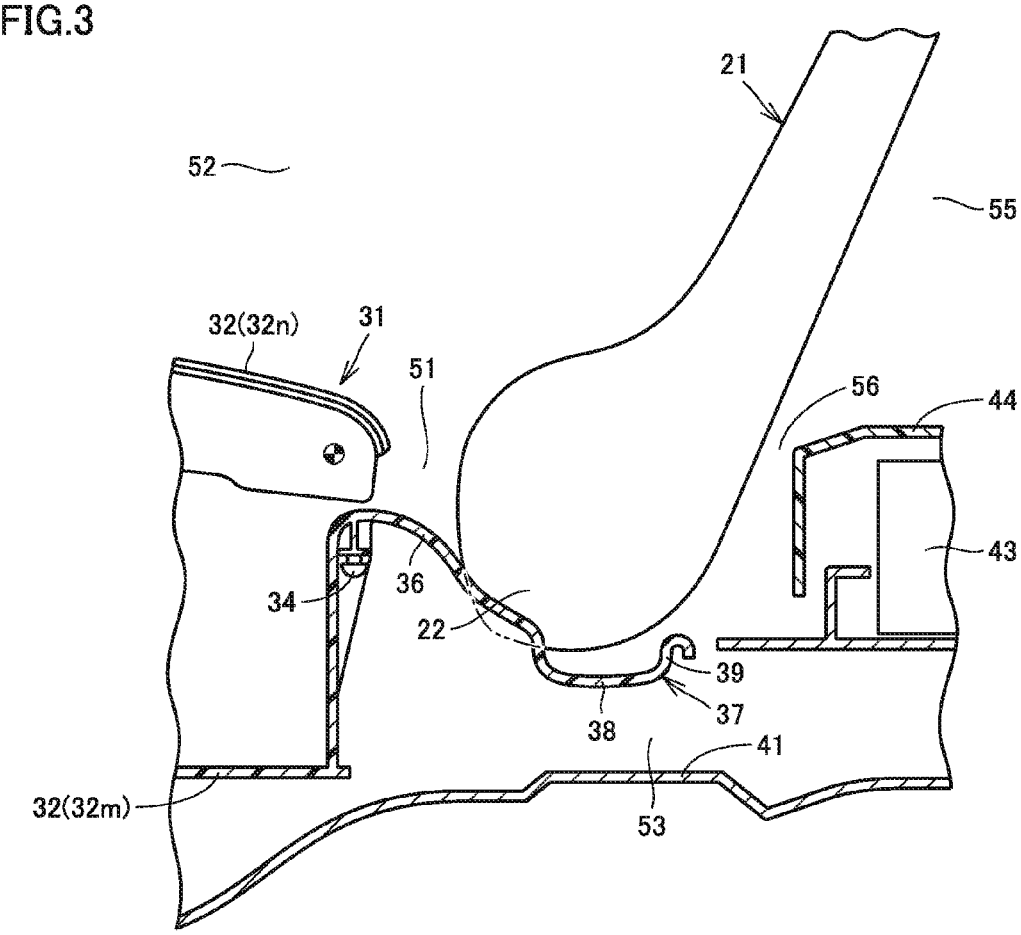
FIG. 3 is a cross-sectional view of the vehicle along the line III-III shown in FIG. 1.

FIG. 2 is a perspective view showing the appearance of the console box shown in FIG. 1. FIG. 3 is a cross-sectional view of the vehicle along the line III-III shown in FIG. 1.

With reference to FIGS. 1 to 3, the rear seat 10 is installed on a floor panel 41. The floor panel 41 firms a part of the body of the vehicle 100. Between the floor panel 41 and the rear seat 10, an under-seat space 53 is provided.

On the vehicle rear side of the rear seat 10, a luggage compartment 55 to store luggage is provided. In the luggage compartment 55, a floor member 44 is installed that forms a floor surface of the luggage compartment 55. The floor member 44 is made of a plate material extending substantially horizontally. The backrest portion 21 and the floor member 44 define a gap 56 between them. The gap 56 leads to the under-seat space 53. The floor panel 41 has a battery 43 mounted thereon. The battery 43 is disposed between the floor member 44 and the floor panel 41.

The structure of the console box 31 will be described in more detail. The console box 31 includes a body portion 32, a projecting portion 36, and a tray portion 37. The console box 31 is formed of a resin molding as a whole.

The body portion 32 is in the form of a housing and forms a major portion of the console box 31 as a storage case. The body portion 32 is disposed along the vehicle front-back direction and defines, together with the backrest portion 21, a gap 51.

The backrest portion 21 includes a lower end portion 22 as its constituent portion. The lower end portion 22 is disposed between the body portion 32 and the battery 43 in the vehicle front-back direction. The gap 51 is provided between the body portion 32 and the lower end portion 22 of the backrest portion 21. The gap 51 has a given width and extends in the vehicle width direction.

The body portion 32 is, in a planar view, substantially in the shape of a rectangle where the vehicle front-back direction corresponds to the longitudinal direction and where the vehicle width direction corresponds to the short direction. In the present embodiment, the body portion 32 is formed of a box portion 32m and a lid portion 32n combined together. The box portion 32m is in the form of a box that is open upward. The lid portion 32n is provided in such a manner that it can open and close the opening of the box portion 32m. The lid portion 32n also serves as an armrest of an occupant seated on the rear seat 10.

The projecting portion 36 is connected to the body portion 32 (box portion 32m) with a clip member 34. The projecting portion 36 projects from the body portion 32 to immediately below the backrest portion 21. The projecting portion 36 projects from the body portion 32 toward the rear of the vehicle. The projecting portion 36 projects from the body portion 32 obliquely downwards. The projecting portion 36 is firmed of a plate material substantially the same in length as the body portion 32 (box portion 32m) in the vehicle width direction. The projecting portion 36 separates the gap 51 and the under-seat space 53 from each other.

The projecting portion 36 is in contact with the backrest portion 21 (lower end portion 22). A surface of the backrest portion 21 is in contact with the projecting portion 36 and is deformed inward accordingly. That is, the projecting portion 36 and the backrest portion 21 are in surface contact with each other. The projecting portion 36 is in contact with the backrest portion 21 in the section where the projecting portion 36 projects obliquely downwards. The projecting portion 36 is in contact with the backrest portion 21 between the body portion 32 and the tray portion 37.

The tray portion 37 is disposed in the projecting portion 36 and is located below the gap 51. The tray portion 37 is provided integrally with the plate material that forms the projecting portion 36. The tray portion 37 is disposed at the tip of the projecting portion 36 that projects obliquely downwards. The tray portion 37 is disposed immediately below the backrest portion 21 (lower end portion 22). The tray portion 37 is disposed at a position where at least a part of the tray portion 37 is visible through the gap 56.

The tray portion 37 is in the form of a receiver. More specifically, the tray portion 37 includes a bottom portion 38 and a peripheral wall portion 39 as its constituent portions. The bottom portion 38 forms the bottom of the tray portion 37. The peripheral wall portion 39 is rising up from the outer peripheral edge of the bottom portion 38 to form a wall.

Figure 4:
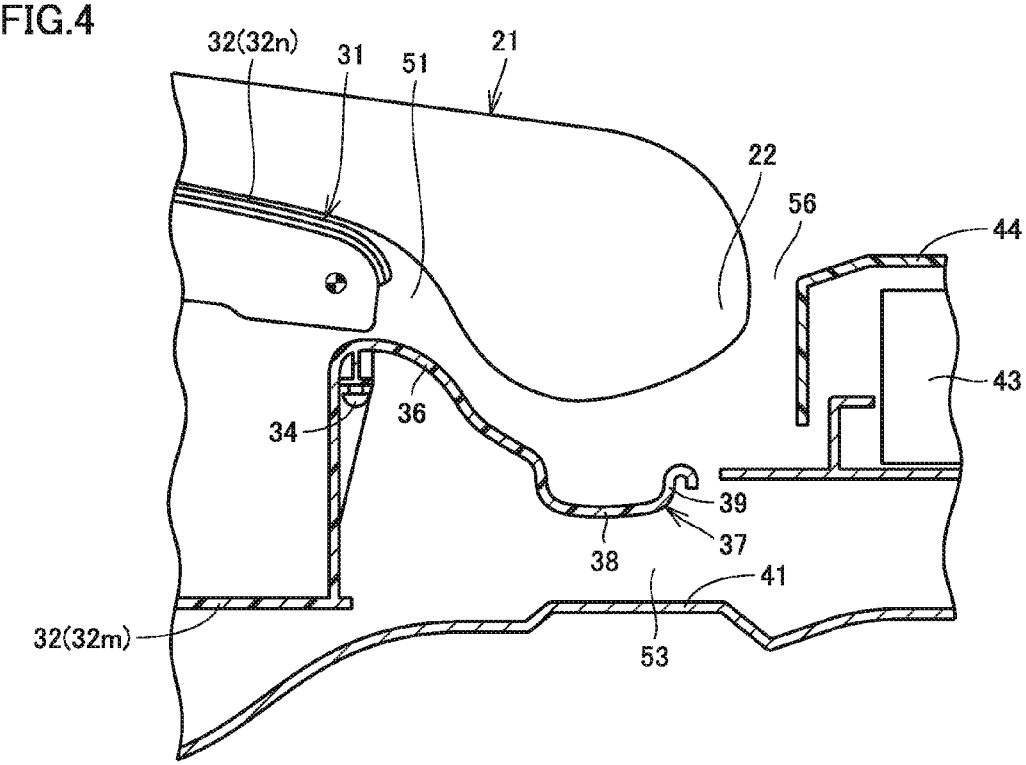
FIG. 4 is a cross-sectional view showing a folded state of the rear seat shown in FIG. 3.

FIG. 4 is a cross-sectional view showing a fielded state of the rear seat shown in FIG. 3. With a reclining operation, the backrest portion 21 changes in form between an in-use state (the state shown in FIG. 3) where the backrest portion 21 stands with respect to the console box 31 and a folded state (the state shown in FIG. 4) where the backrest portion 21 is superposed on the console box 31, with reference to FIGS. 3 and 4.

In the folded state shown in FIG. 4, the backrest portion 21 is disposed on an extension of the floor member 44, thereby expanding the luggage compartment 55. In the in-use state shown in FIG. 3 the projecting portion 36 is in contact with the backrest portion 21, whereas in the folded state shown in FIG. 4 the projecting portion 36 is out of contact with the backrest portion 21.

With reference to FIGS. 1 to 4, there is a case where an article accidentally enters the gap 51 between the body portion 32 of the console box 31 and the backrest portion 21. In the present embodiment, in the in-use state shown in FIG. 3, the projecting portion 36 is in contact with the backrest portion 21 and thus an article gets caught between the projecting portion 36 and the backrest portion 21. If the backrest portion 21 is reclined in this state, however, the article is dragged by the backrest portion 21 and falls into the under-seat space 53.

In the present embodiment, the projecting portion 36 is provided with the tray portion 37 that is in the form of a receiver, and thus an article falling toward the under-seat space 53 can be caught in the tray portion 37. At this time, since the projecting portion 36 projects from the body portion 32 obliquely downwards and is provided with the tray portion 37 at a projecting end of the projecting portion 36, the article that has entered the gap 51 can be guided to the tray portion 37 more reliably. Further, in the folded state shown in FIG. 4, since the projecting portion 36 is out of contact with the backrest portion 21, the article that has entered the gap 51 does not remain caught between the projecting portion 36 and the backrest portion 21.

An article caught in the tray portion 37 is collected, for example, from the luggage compartment 55 side through the gap 56 between the backrest portion 21 and the floor member 44.

Further, in the in-use state shown in FIG. 3, since the projecting portion 36 is in contact with the backrest portion 21, cold air is prevented from leaking from the under-seat space 53 to the rear seat 10. This keeps an occupant seated on the rear seat 10 from feeling cold air and thus can enhance comfort in the vehicle compartment.

The structure of the vehicle 100 according to the embodiment of the present invention described above is summarized as follows: the vehicle 100 in the present embodiment includes the rear seat 10 including the backrest portion 21 and the console box 31 as a forward member adjoining the backrest portion 21 on the vehicle front side. The console box 31 includes the body portion 32 disposed along the vehicle front-back direction, the body portion 32 together with the backrest portion 21 defining the gap 51; the projecting portion 36 projecting from the body portion 32 to immediately below the backrest portion 21; and the tray portion 37 in the form of a receiver, the tray portion 37 being disposed in the projecting portion 36 and located below the gap 51.

According to the vehicle 100 of the embodiment of the present invention thus configured, an article falling toward the under-seat space 53 is caught in the tray portion 37, whereby the fallen article can be collected easily.

Note that while in the present embodiment, a case has been described where the forward member of the present invention is the console box 31, the present invention is not limited thereto. The tray structure of the present invention may also be applied to a seat portion 26 adjoining a backrest portion 21 on the vehicle front side.

A vehicle according to the present invention includes a rear seat including a backrest portion and a forward member adjoining the backrest portion on the vehicle front side. The forward member includes a body portion disposed along the vehicle front-back direction, the body portion together with the backrest portion defining a gap; a projecting portion projecting from the body portion to immediately below the backrest portion; and a tray portion in the form of a receiver, the tray portion being disposed in the projecting portion and located below the gap.

According to the vehicle thus configured, the tray portion that is in the form of a receiver is disposed in the projecting portion of the forward member, thereby allowing the tray portion to receive an article that has fallen from the gap between the body portion and the backrest portion into the area under the rear seat. This allows easy collection of a fallen article from the area under the rear seat.

Furthermore, preferably, the forward member is a console box providing an article storage space. The body portion is in the form of a housing.

According to the vehicle thus configured, an article that has fallen from the gap between the console box and the backrest portion into the area under the rear seat can easily be collected.

Furthermore, preferably, the projecting portion projects from the body portion obliquely downwards and is provided with the tray portion at a projecting end of the projecting portion.

According to the vehicle thus configured, an article that has entered the gap between the body portion and the backrest portion can be guided to the tray portion more reliably.

Furthermore, preferably, the projecting portion is in contact with the backrest portion.

According to the vehicle thus configured, the projecting portion separates the space in the vehicle compartment from the space below the rear seat, thereby enhancing comfort in the vehicle compartment.

Furthermore, preferably, the backrest portion has a reclining function whereby the backrest portion can tilt in the vehicle front-back direction, and the backrest portion switches between a first state where the backrest portion stands with respect to the forward member and a second state where the backrest portion is superposed on the forward member.

According to the vehicle thus configured, if an article that has entered the gap between the forward member and the backrest portion is dragged by the backrest portion at the time of the reclining of the backrest portion and falls into the area under the rear seat, the fallen article can be easily collected.

Furthermore, preferably, in the first state the projecting portion is in contact with the backrest portion, and in the second state the projecting portion is out of contact with the backrest portion.

According to the vehicle thus configured, an article that has entered the gap between the body portion and the backrest portion can be guided to the tray portion more reliably when the backrest portion switches to the second state.

The present invention is applied to a vehicle including a rear seat.

Though the embodiment of the present invention has been described, it should be understood that the embodiment disclosed herein is for the purpose of illustration only and non-restrictive in any respect. The scope of the present invention is defined by the terms of the claims and is intended to include any modification within the meaning and scope equivalent to the terms of the claims.

What is claimed is:
1. A vehicle comprising:
  a rear seat including a backrest portion and a forward member adjoining the backrest portion on a vehicle front side, wherein the forward member is a console box providing an article storage space,
  the forward member including
    a body portion disposed along a vehicle front-back direction, the body portion together with the backrest portion defining a gap, wherein the body portion is in a form of a housing,
    a projecting portion projecting from the body portion to immediately below the backrest portion, and
    a tray portion in a form of a receiver, wherein the projecting portion projects from the body portion obliquely downwards and is provided with the tray portion at a projecting end of the projecting portion and the tray portion is located below the gap.
2. The vehicle according to claim 1, wherein the projecting portion is in contact with the backrest portion.
3. The vehicle according to claim 1, wherein the backrest portion has a reclining function to tilt in the vehicle front-back direction, and the backrest portion switches between a first state where the backrest portion stands with respect to the forward member and a second state where the backrest portion is superposed on the forward member.
4. The vehicle according to claim 3, wherein in the first state the projecting portion is in contact with the backrest portion, and in the second state the projecting portion is out of contact with the backrest portion.

5. The vehicle according to claim 1, wherein the tray portion is disposed immediately below the backrest portion.

* * * * *